(12) United States Patent
Poncelet

(10) Patent No.: US 6,685,836 B2
(45) Date of Patent: Feb. 3, 2004

(54) METHOD FOR SEPARATING A MIXTURE OF COLLOIDAL ALUMINOSILICATE PARTICLES

(75) Inventor: Olivier J. Poncelet, Chalon (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/995,093

(22) Filed: Nov. 27, 2001

(65) Prior Publication Data

US 2002/0100728 A1 Aug. 1, 2002

(30) Foreign Application Priority Data

Dec. 5, 2000 (FR) .............................................. 0015710

(51) Int. Cl.[7] .................................................. C02F 1/44
(52) U.S. Cl. .................. 210/651; 210/500.41; 209/235; 209/268; 209/2
(58) Field of Search .............................. 210/510.1, 651, 210/691, 500.41; 209/235, 268, 2

(56) References Cited

U.S. PATENT DOCUMENTS

| | | | | |
|---|---|---|---|---|
| 4,069,157 A | * | 1/1978 | Hoover et al. ............... | 210/500 |
| 4,908,133 A | | 3/1990 | Wuest et al. ................. | 210/641 |
| 5,069,794 A | * | 12/1991 | Haag et al. .............. | 210/651 X |
| 5,268,101 A | * | 12/1993 | Anderson et al. ......... | 210/510.1 |
| 5,403,490 A | * | 4/1995 | Desai .......................... | 210/652 |
| 5,989,433 A | * | 11/1999 | Martin et al. ................ | 210/653 |
| 6,054,052 A | * | 4/2000 | Dhingra et al. .......... | 210/691 X |
| 6,083,401 A | * | 7/2000 | Martin et al. ................ | 210/653 |
| 6,478,968 B1 | * | 11/2002 | Perrona et al. ............. | 210/651 |

FOREIGN PATENT DOCUMENTS

| | | |
|---|---|---|
| EP | 0 741 668 B1 | 11/1996 |
| JP | 05279012 | 10/1993 |
| RU | 2088527 | 8/1997 |

OTHER PUBLICATIONS

Journal of Soil Science, 1979, 30, 347, S.I. Wada, A. Eto, K. Wada.
P. Bayliss, Can. Mineral. Mag., 1987, 327.

* cited by examiner

*Primary Examiner*—Donald P. Walsh
*Assistant Examiner*—Matthew J. Kohner
(74) *Attorney, Agent, or Firm*—J. Jeffrey Hawley

(57) ABSTRACT

The invention relates to a method for separating a mixture of aluminosilicates, wherein said method consists in carrying out an ultrafiltration of a solution of colloidal aluminosilicate particles so as to obtain a permeate and a retentate, and an imogolite like fibrous aluminosilicate polymer of high purity with an Al:Si molar ratio between 1.8 and 2.5 is obtained in the retentate, and allophanes like spherical aluminosilicate particles are obtained in the permeate.

8 Claims, 2 Drawing Sheets

METHOD FOR SEPARATING A MIXTURE OF COLLOIDAL ALUMINOSILICATE PARTICLES

FIELD OF THE INVENTION

This invention relates to the separation of mixtures of colloidal aluminosilicate particles to extract from them on the one hand a high purity imogolite like fibrous aluminosilicate polymer and on the other hand allophane like spherical aluminosilicate particles.

BACKGROUND OF THE INVENTION

Imogolite is an aluminosilicate polymer that occurs in the form of fibers that are most probably hollow. Imogolite occurs naturally in volcanic ash and in certain soils. Natural imogolite is impure, being mixed with other aluminosilicates such as allophanes and/or raft-like boehmite. Natural imogolite cannot be used in this impure form in currently known applications, such as for use as a basic constituent for antistatic layers designed for example for photographic products as described in European Patent 0 714 668. In the same way, allophanes, if mixed wither other aluminosilicates, cannot be used in their impure form in their own applications, such as for use as gelling agent for cosmetics.

There exist various processes for synthesizing imogolite of ranging purity. For example U.S. Pat. Nos. 4,152,404 and 4,252,779 of Farmer describe a process for preparing an inorganic material analogous to natural imogolite. European Patent 0 741 668 describes a process to obtain imogolite of high purity with an Al:Si molar ratio of between 1 and 3. The imogolite obtained is rid of charges, such as salts, by dialysis. However, this process will not separate allophanes, which are uncharged, from the imogolite.

According to the known literature, for example Journal of Soil Science, 1979, 30, 347, S. I. Wada, A. Eto, K. Wada, a pure imogolite has an Al:Si molar ratio close to 2. It is specified here that the terms "very high purity" or "high purity" designate an aqueous solution containing at least 80% and preferably at least 90% imogolite by weight. The term "imogolite like" means a composition of anisotropic, fibrous aluminosilicate particles with an Al: Si molar ratio of between 1 and 3, and preferably close to 2. These particles are at least 1 μm long and have a diameter of about 20 nm.

The process described in European Patent 0 741 668 is relatively long and has to be followed scrupulously if high purity imogolite is to be obtained. In particular it is absolutely necessary, during the digestion and filament growth step, to keep the pH and Al+Si concentration within precisely defined ranges of values. If the synthesis is uncontrolled, then the formation of silica gels, boehmite or allophanes is observed. Boehmite has a non-fibrous structure with an Al:Si molar ratio greater than 4. Allophanes are spherically shaped aluminosilicate particles that are smaller than imogolite particles and have a different Al:Si ratio. The term "allophane like" means a composition of hollow spherical aluminosilicate particles, with an Al:Si molar ratio of between 1 and 4. These particles have a diameter of between 3,5 and 5,5 nm. In addition allophanes are amorphous (P. Bayliss, Can. Mineral. Mag., 1987, 327) whereas imogolites are crystalline.

If the synthesis has not been sufficiently well controlled, then the imogolite obtained is not pure enough for known applications and so is useless. As the same way allophanes, being mixed with the imogolite, are also useless in their own applications.

This invention provides a method for obtaining, simply and cheaply, on the one hand very high purity imogolite and on the other hand allophanes from a mixture of colloidal aluminosilicate particles, i.e., an impure imogolite solution deriving from either a natural source or an uncontrolled synthesis.

SUMMARY OF THE INVENTION

The present invention is a method for separating a mixture of colloidal aluminosilicate particles in aqueous dispersion, comprising the step of passing said mixture through an ultrafiltration unit whereby a permeate and a retentate are obtained, and an imogolite like fibrous aluminosilicate polymer with an Al:Si molar ratio between 1.8 and 2.5 is obtained in the retentate, and allophanes like spherical aluminosilicate particles are obtained in the permeate.

Preferably, the imogolite like fibrous aluminosilicate polymer obtained in the retentate has an Al:Si molar ratio between 1.9 and 2.

Imogolite obtained in the retentate and allophanes obtained in the permeate are recovered and can then be used in their own applications.

DETAILED DESCRIPTION OF THE INVENTION

Figure 1:
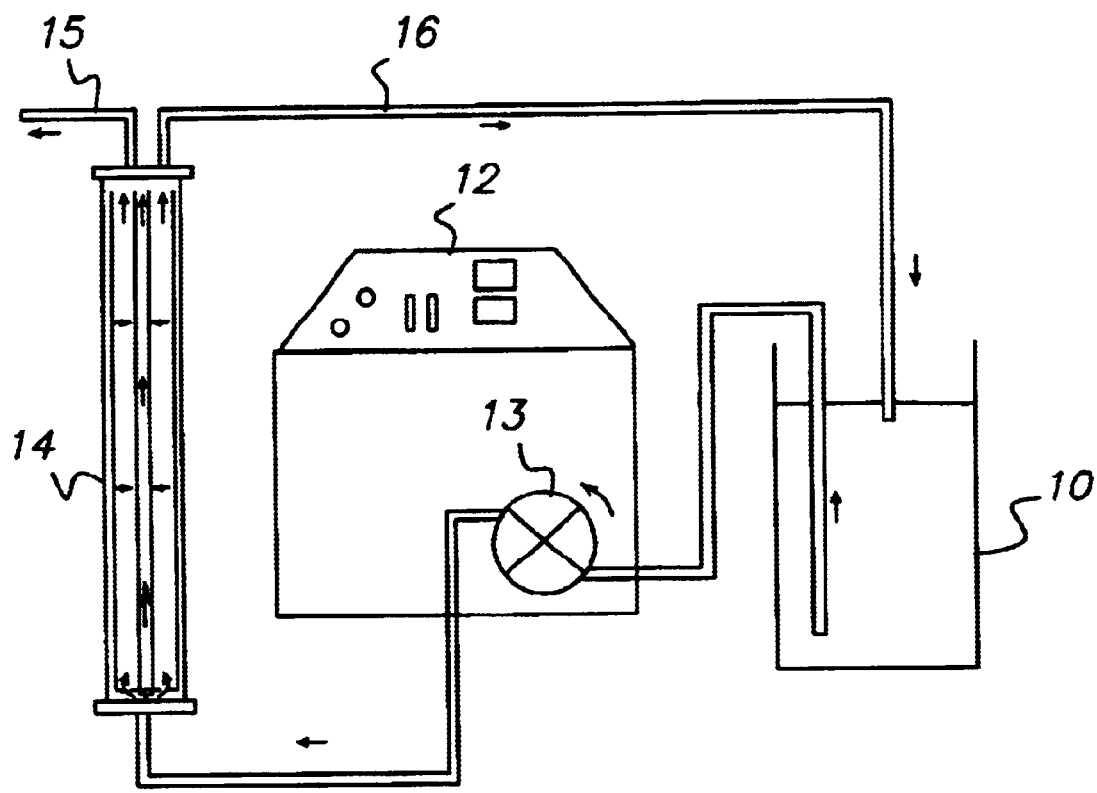
FIG. 1 depicts a set-up for implementing the method according to the invention.

According to the method of the invention the mixture of colloidal aluminosilicate particles to be treated can be a natural mineral containing imogolite and allophanes which can be dissolved by dispersion in an acid solution.

The starting solution can also derive from a synthesis of imogolite by a process that is uncontrolled, so yielding an impure imogolite mixed with allophanes.

According to the method of the invention the imogolite and the allophanes are separated from an aluminosilicate mixture by ultrafiltration. Imogolite is obtained in the retentate and allophanes are obtained in the permeate. A tangential ultrafiltration unit can be used, in which the solution is pumped at high speed along the ultrafiltration membrane, or else a frontal ultrafiltration unit, in which the solution is pumped under higher pressure at right angles to the membrane.

A preferred embodiment consists in carrying out a tangential ultrafiltration on a polyethersulfone membrane. Other types of membranes include polyvinylidene fluoride (PVDF), or cellulose acetate or are based on acrylonitrile or acrylic acid polymers and copolymers. This embodiment is represented diagrammatically in FIG. 1. According to this diagram the solution 10 of the mixture of aluminosilicate particles to be purified is sent by a pump via the pump unit 12 and the pump 13 into an ultrafiltration unit 14. The permeate, containing in particular the allophanes, is run out through the pipe 15. The retentate, purified once, is sent back to 10 through pipe 16. The ΔP set up across the membrane is between 2 and 2.8 bar. The laminar flow of retentate is enough to avoid the accumulation of imogolite on the walls of the ultrafiltration unit 14. The laminar flow is preferably equal to about 0.25 to 10 liters per minute per square meter of membrane surface area and more preferably 0.5 to 5 and still more preferably 1 liter per minute per square meter of membrane surface area.

In one embodiment the aluminosilicate mixture to be purified is prefiltered before the ultrafiltration step, for example by centrifugation and decantation, to remove large particles such as those of raft-like boehmite.

After a certain number of passes through the ultrafiltration unit, depending on viscosity and on the degree of purity of imogolite that is desired, the method of the invention yields a retentate consisting of a imogolite like fibrous aluminosilicate polymer with an Al:Si molar ratio between 1.8 and 2.5 and a permeate comprising allophanes. Typically, the number of passes is between 1 and 10. High purity imogolite is thereby obtained in the retentate on the one hand, the allophanes being obtained in the permeate on the other hand. Preferably, the ultrafiltration is continued until an Al:Si molar ratio between 1.9 and 2 is obtained in the retentate, so long as the viscosity of the retentate solution does not prevent the ultrafiltration being performed.

As pure imogolite is characterized by an Al:Si molar ratio close to 2, the method of the invention yields an imogolite of very high purity in a particularly cheap and readily implemented way.

The imogolite purified according to the method of the invention can then be dissolved in osmosed water and used for any application that has hitherto required pure synthesized imogolite.

The allophanes obtained in the permeate can also be used for their own applications.

The following examples illustrate the invention.

Preparation 1

Preparation of a high purity imogolite.

Imogolite was synthesized according to the process described in European Patent 0 741 668. According to the instructions provided for the digestion step the Al+Si concentration must be between 0.3 and 0.6 g/l and the pH between 3.9 and 4.2.

A Raman or infrared spectrum showed that an imogolite solution was obtained that was of very high purity with an Al:Si ratio equal to 1.96 (measured by inductively coupled plasma atomic emission spectroscopy, ICP).

Preparation 2

Preparation of a solution containing imogolite and allophanes.

An impure imogolite was modeled by making up a mixture of aluminosilicate particles rich in allophanes by synthesizing imogolite according to Example 1, but without controlling the Al+Si concentration during the digestion step. The Al+Si concentration was thus maintained above 0.6 g/l and the pH was left unchanged.

A Raman or infrared spectrum showed that an impure imogolite solution was obtained containing allophanes, with an Al:Si ratio equal to 1.7 (measured by ICP).

EXAMPLES 1–2

Purification

The solutions of Preparations 1 and 2 were each treated according to the method of the invention using a tangential ultrafiltration unit represented in FIG. 1. This ultrafiltration unit 14 comprised a 100 KD polyethersulfone membrane sold by AMICON, and the ΔP applied was 2 bar. Initially, an industrial ultrafiltration unit (Rhodia-Orelis) was used with a membrane surface area of 15 square meters and a retentate laminar flow of 15 liters/minute. The retentate from the industrial unit was then subjected to a laboratory ultrafiltration unit (Amicon, Proflux™ M12) with a membrane surface area of 0.3 square meters and a retentate laminar flow of r300 ml/minute. Surprisingly, the laminar flow of retentate was directly proportional to the membrane surface area.

The results after each pass through the ultrafiltration unit are represented respectively in Table I for the allophane-rich imogolite solution and in Table II for the high purity imogolite solution.

The Al+Si concentration and the Al:Si ratio were measured by inductively coupled plasma atomic emission spectroscopy (ICP).

The imogolite concentration was calculated on the basis of the following formula: $(OH)_3Al_2O_3SiOH$ with a molar mass of 198 g.

TABLE I

| No. of ultrafiltration passes | [Al + Si] g/l | Imogolite g/l | Al/Si molar ratio | Weight of retentate (kg) | Viscosity of retentate |
|---|---|---|---|---|---|
| 0 | 2.55 | 6.23 | 1.7 | 19.51 | Good |
| 1 | 11.10 | 27.13 | 1.77 | 3.3 | Good |
| 2 | 20.545 | 50.226 | 1.82 | 1.5 | Good |
| 3 | 30.032 | 73.4 | 2.0 | 1 | Good |
| 4 | 33.380 | 81.6 | 2.05 | 0.8 | Too viscous |

The results in Table I show that after three passes in the ultrafiltration unit the initial allophane-rich mixture contained 73.4 g/l of imogolite with an Al:Si ratio equal to 2. Thus a high purity imogolite was obtained in the retentate, the allophane particles being obtained in the permeate.

A sample of the final retentate and of the permeate of the allophane-enriched imogolite solution were taken and examined by Raman spectrography.

Figure 2:
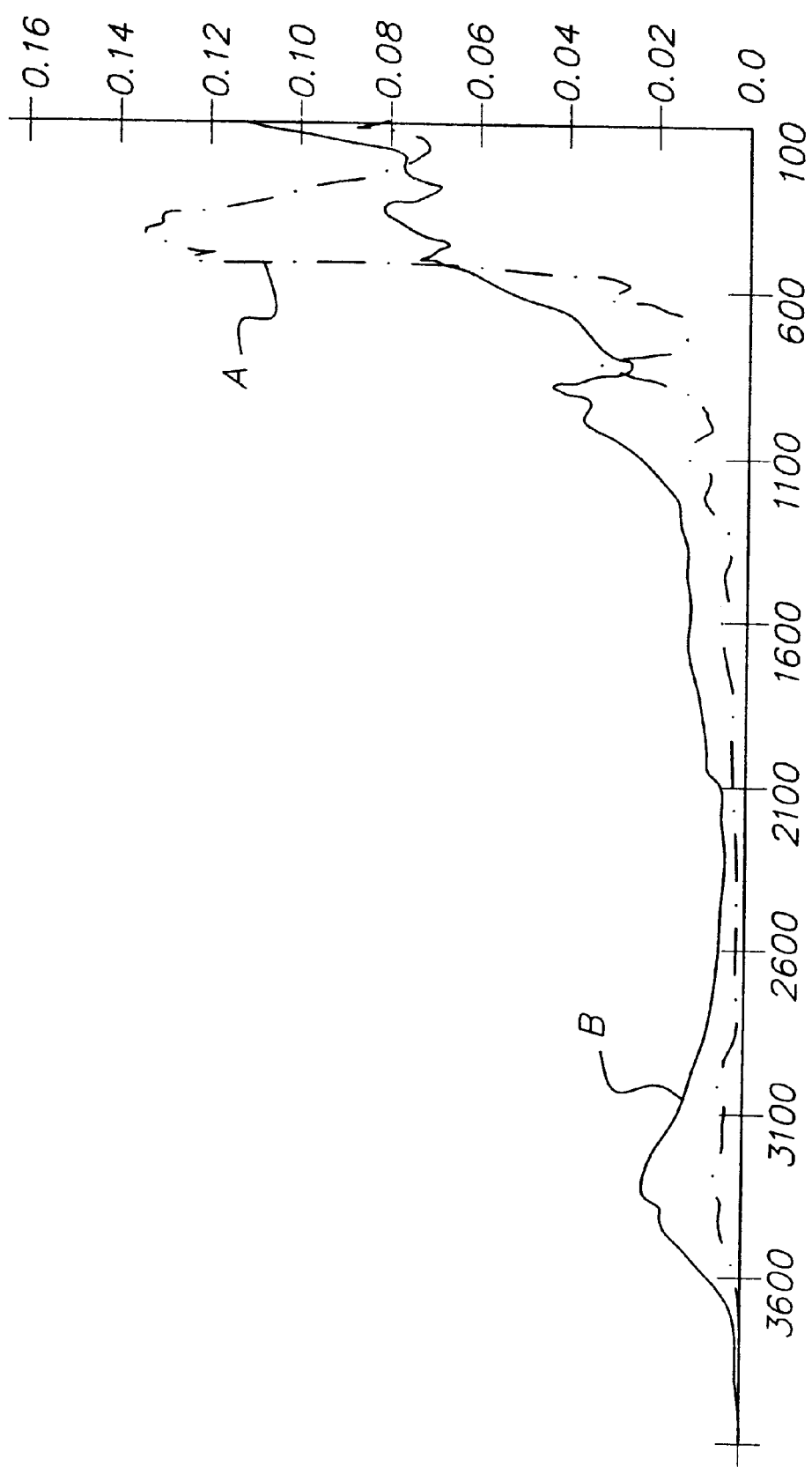
FIG. 2 shows the spectra obtained by Raman spectrography of a retentate obtained after treatment of an aluminosilicate mixture according to the method of the invention, and of the corresponding permeate.

In FIG. 2 spectrum A corresponds to the final retentate from the purification of the allophane-rich imogolite. Spectrum B corresponds to the corresponding recovered permeate. The difference between the two spectra obtained shows unequivocally that a very high purity imogolite was obtained in the retentate, and allophane particles in the permeate. Thus the ultrafiltration of the aluminosilicate mixture according to the invention separated the imogolite from the allophanes, which although very similar chemically are very different morphologically.

The ultrafiltration also removed water and by-products (alcohols, sodium salts) from the imogolite synthesis.

Imogolite obtained after ultrafiltration had a high concentration close to 74 g/l, above which value the viscosity became too great for ultrafiltration to be continued further. This purified imogolite can be dissolved in osmosed water at the concentrations required for relevant applications. The obtained allophanes can also be used for their own relevant applications. For example, they can be purified by nanofiltration.

TABLE II

| No. of ultrafiltration passes | [Al + Si] g/l | Imogolite g/l | Al/Si molar ratio | Weight of retentate (kg) | Viscosity of retentate |
|---|---|---|---|---|---|
| 0 | 3.2 | 7.81 | 1.96 | 18.2 | Good |
| 1 | 30.2 | 73.82 | 2.0 | 1.80 | Good |

Table II shows that starting from an imogolite that is already very pure, containing no allophanes, there was practically no loss of aluminosilicate compounds. In this case ultrafiltration simply concentrated the already pure imogolite by removing water and by-products (alcohols, sodium salts) deriving from the imogolite synthesis.

The values in Table I of [Al+Si] concentration, imogolite and Al:Si ratio of an allophane-rich imogolite solution treated according to the method of the invention are similar to those in Table II obtained for a solution of imogolite known to be highly pure. This shows that the method of the invention will separate imogolite from allophanes.

The invention has been described in detail with particular reference to certain preferred embodiments thereof, but it will be understood that variations and modifications can be effected within the spirit and scope of the invention.

I claim:

1. A method for separating a mixture of colloidal aluminosilicate particles in aqueous dispersion, comprising the step of passing said mixture through an ultrafiltration unit whereby a permeate and a retentate are obtained, and an imogolite like fibrous aluminosilicate polymer with an Al:Si molar ratio between 1.8 and 2.5 is obtained in the retentate, and allophane like spherical aluminosilicate particles are obtained in the permeate.

2. The method according to claim 1, wherein an imogolite like fibrous aluminosilicate polymer with an Al:Si molar ratio between 1.9 and 2 is obtained in the retentate.

3. The method according to claim 1, comprising the step of recovering the imogolite like fibrous aluminosilicate polymer from the retentate.

4. The method according to claim 1, comprising the step of recovering the allophane like spherical aluminosilicate particles from the permeate.

5. The method according to claim 1, wherein the ultrafiltration unit is a tangential ultrafiltration unit.

6. The method according to claim 5, wherein said tangential ultrafiltration unit comprises a polyethersulfone-based ultrafiltration membrane.

7. The method according to claim 6, wherein the laminar flow of retentate is equal to about 1 liter/minute per square meter of membrane surface area.

8. The method according to claim 1, wherein said mixture is prefiltered before the ultrafiltration step.

* * * * *